Nov. 27, 1923.

J. M. SHOBERT

BOLL WEEVIL DESTROYER

Filed Nov. 8, 1922

Inventor
J. M. Shobert

By Lacey & Lacey, Attorneys

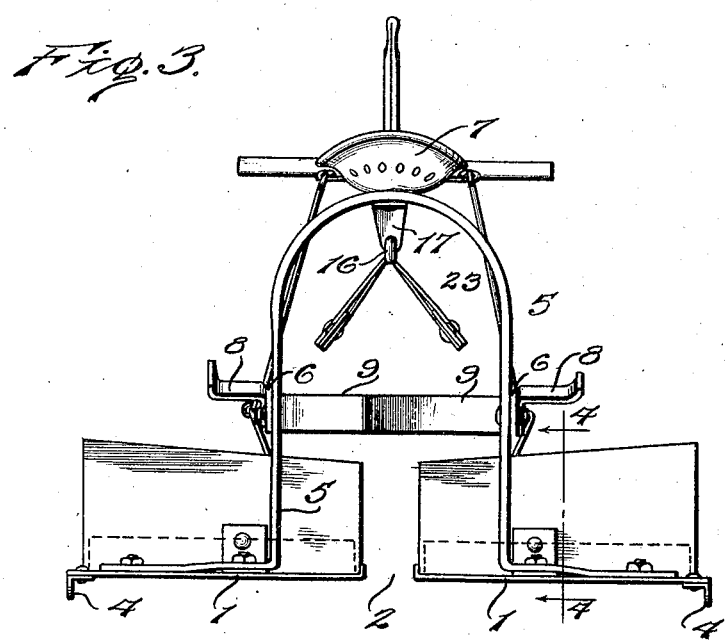
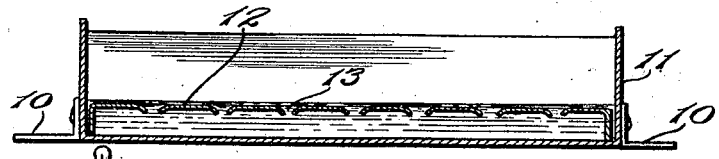
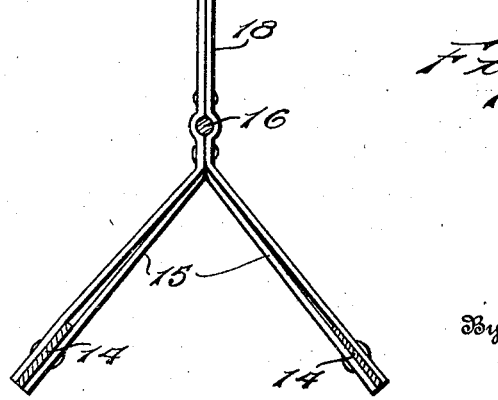

Patented Nov. 27, 1923.

1,475,413

UNITED STATES PATENT OFFICE.

JACOB MILTON SHOBERT, OF NOBLE, OKLAHOMA.

BOLL-WEEVIL DESTROYER.

Application filed November 8, 1922. Serial No. 599,685.

*To all whom it may concern:*

Be it known that I, JACOB M. SHOBERT, a citizen of the United States, residing at Noble, in the county of Cleveland and State of Oklahoma, have invented certain new and useful Improvements in Boll-Weevil Destroyers, of which the following is a specification.

This invention relates to boll weevil destroyers and has for its object the provision of a machine of inexpensive construction which may be readily drawn over a field along a row of plants and so engage the same as to remove weevils and other injurious insects so that the plant may have a normal growth and produce a valuable crop. The invention seeks to provide a machine which will be of light draft and will be held easily to its path and will be so constructed that the plants past which the machine is drawn will be agitated or shaken forcibly so that the imperfect bolls and all destructive insects will be beaten therefrom. The invention is illustrated in the accompanying drawings and will be hereinafter fully set forth.

In the drawings—

Fig. 3 is a rear end elevation;

Fig. 4 is a longitudinal section through one of the pans on the line 4—4 of Fig. 3, and Fig. 5 is an enlarged detail section on the line 5—5 of Fig. 1.

Figure 1:
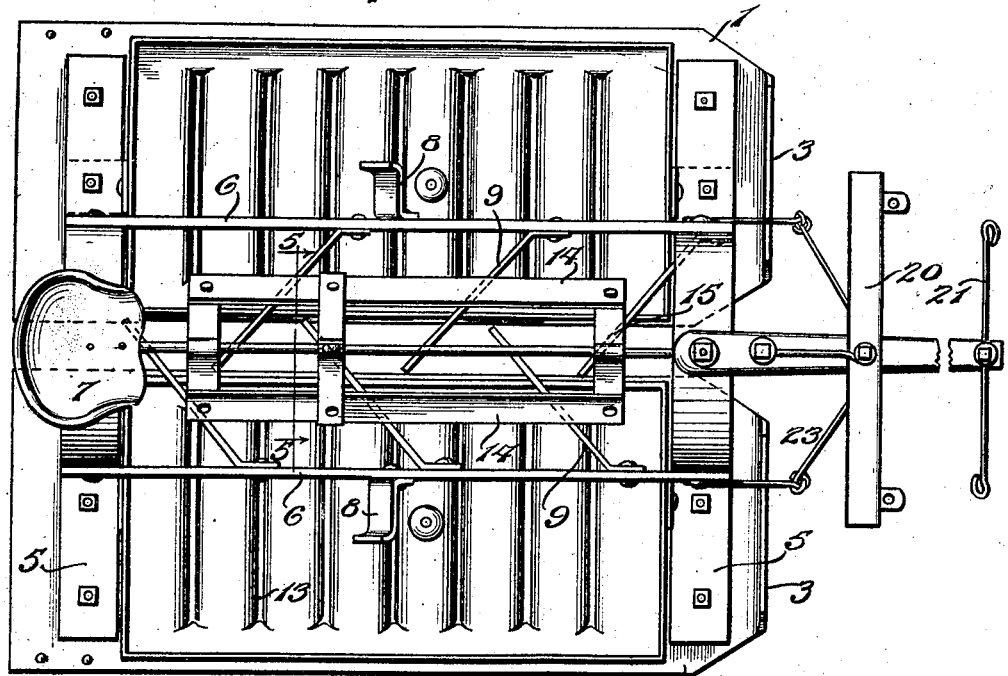
Figure 1 is a plan view of a machine embodying my present invention.
Figure 2:
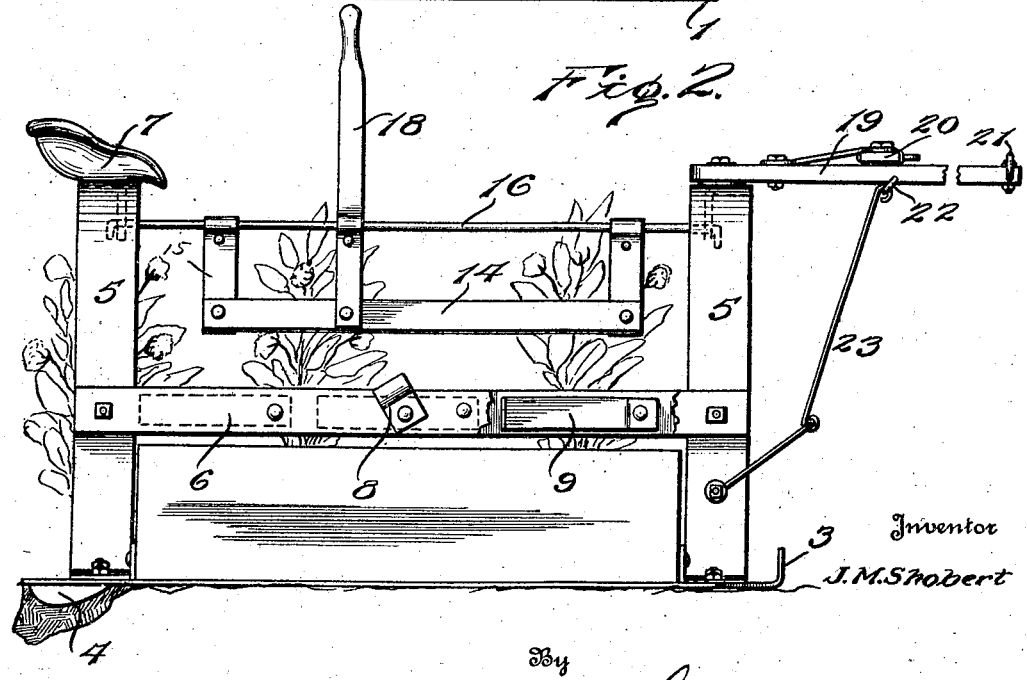
Fig. 2 is a side elevation of the same partly broken away.

In carrying out my invention, I employ a pair of runners 1 which are disposed in parallel relation with a space, indicated at 2, between their inner side edges to permit the runners to pass along a field at opposite sides of the plants. The front ends of the runners are upturned, as shown at 3, to facilitate their travel over the surface of the ground and at their outer edges at their rear ends, the runners are provided with depending guide plates 4 which are adapted to penetrate the ground and hold the runners to a straight path. Upon the runners adjacent the front and rear ends thereof, I secure arches 5 whereby the runners will be held in the proper relation, and these arches are connected by longitudinal beams 6 so that a rigid structure is produced. Upon the rear arch is secured a seat 7 for the driver and upon the outer sides of the beams 6 are foot rests 8 which may be of any preferred form. To the inner sides of the beams 6, I secure deflector arms or blades 9 which are so arranged as to present a flat surface to the plants so that they may deflect the plants from side to side as the machine proceeds along the row without cutting any of the stalks or otherwise injuring the plants. As shown most clearly in Fig. 1, these deflectors are disposed obliquely so as to extend rearwardly and inwardly, and the deflectors upon the two beams are so arranged that their inner ends alternate whereby, as the machine travels along a row of plants, the plants will be successively beaten in opposite directions so that all the imperfect bolls and the insects feeding upon the plants will be dislodged in an obvious manner. Extending longitudinally of the runners and secured thereto by brackets 10 are pans 11 which may contain gasoline or other material which will destroy the insects falling thereinto, and these pans are so arranged that their inner sides will be below the series of deflectors 9 in order that the dislodged insects will fall into the pans. To prevent the liquid placed in the pans from splashing out of the same, I provide a baffle or cover 12 which is adapted to fit snugly but removably within the pans and is constructed with transverse slots 13 of proper size to permit the insects to pass therethrough and to permit a small portion of the liquid to rise above the baffle or cover and form a film thereon so that any insects which may escape the transverse slots will, nevertheless, be deposited in the liquid and destroyed.

To aid in dislodging the insects, I provide an oscillatory beater consisting of side bars or plates 14, carried by inverted V-shaped arms 15 which are suspended upon a longitudinal rod 16 fitted at its ends in brackets or hangers 17 secured to the respective arches 5 at the tops of the same. The hangers or brackets 15 may be provided in any desired number and intermediate the ends of this beater a handle or lever 18 is formed with or secured to one of the arms so that the driver upon the seat 7 may oscillate the beater to aid in dislodging the pests upon the plants. This beater is also advantageous in that it furnishes a ready means for releasing any plants which may tend to bind between successive deflectors and thereby retard the progress of the machine or tend to injure the plants.

The machine may be drawn over the field by any convenient means, such as a tractor or draft animals, and I have illustrated a draft pole or tongue 19 secured at its rear end upon the front arch 5 and equipped with a whiffletree 20 and a neck yoke 21. A cross arm 22 is secured to the under side of the pole or tongue, preferably beneath the whiffletree, and this cross arm is connected with the sides of the front arch 5 by draft links 23 so that an even easy draft will be applied to the machine.

The operation of the device will, it is thought, be readily understood. The machine is drawn over the field along a row of plants so as to pass at opposite sides thereof and as it progresses, the deflectors 9 will be brought successively against the plants so that they will be pushed first to one side and then to the other side and thereby shaken with sufficient force to dislodge the insects and imperfect bolls or buds. Should the deflectors not agitate the plants sufficiently to satisfactorily remove the insects, a few oscillations of the rocking beater will attain the desired results. The insects will be collected in the pans and the covers 12 may be removed from time to time as may be necessary to destroy the caught insects or to replenish the supply of liquid. The device is exceedingly simple and compact in the construction and arrangement of its parts and is not apt to get out of order.

Having thus described the invention, what is claimed as new is:

An apparatus for the purpose set forth comprising a pair of runners, arches erected on and connecting the runners near their front and rear ends, rigid side beams connecting the arches at intervening points in the height thereof, flat-faced rigid deflectors secured to the inner sides of the beams and projecting inwardly and rearwardly therefrom, a longitudinal rod secured at its ends to the tops of the arches, inverted V-shaped frames mounted on said rod for oscillation, means whereby said frames may be oscillated, longitudinal beater plates secured to and extending between the lower ends of said frames above the deflectors, and draft-applying devices connected to the front arch.

In testimony whereof I affix my signature.

JACOB MILTON SHOBERT. [L. S.]